US008958685B2

(12) United States Patent
Doyle et al.

(10) Patent No.: US 8,958,685 B2
(45) Date of Patent: Feb. 17, 2015

(54) WORD CLOUD AUDIO NAVIGATION

(75) Inventors: Michael Doyle, Bristol (GB); Thomas Greenwood, Newport (GB)

(73) Assignee: Avaya Inc., Basking Ridge, NJ (US)

( * ) Notice: Subject to any disclaimer, the term of this patent is extended or adjusted under 35 U.S.C. 154(b) by 491 days.

(21) Appl. No.: 12/542,452

(22) Filed: Aug. 17, 2009

(65) Prior Publication Data

US 2011/0040562 A1 Feb. 17, 2011

(51) Int. Cl.
*H04N 5/765* (2006.01)
*H04N 9/80* (2006.01)
*H04L 29/06* (2006.01)
*G11B 27/32* (2006.01)
*H04M 3/42* (2006.01)

(52) U.S. Cl.
CPC .......... *H04L 65/1076* (2013.01); *G11B 27/322* (2013.01); *H04L 63/06* (2013.01); *H04L 63/30* (2013.01); *H04M 3/42221* (2013.01); *H04M 2201/38* (2013.01); *H04M 2201/40* (2013.01)
USPC .......................................... 386/248; 386/232

(58) Field of Classification Search
CPC ....... H04N 5/77; H04N 5/772; H04N 1/2112; H04N 5/907; H04N 13/0048; H04N 13/0055; H04N 2101/00; H04N 5/782; H04N 21/47214; H04N 21/4334; H04N 5/76; H04N 5/781; G11B 27/105; G11B 2220/2541; G11B 27/034; G11B 27/34
USPC .................................................. 386/290–295
See application file for complete search history.

(56) References Cited

U.S. PATENT DOCUMENTS

| 6,151,576 | A | 11/2000 | Warnock et al. |
| 7,039,585 | B2 | 5/2006 | Wilmot et al. |
| 7,466,334 | B1 | 12/2008 | Baba |
| 2004/0186712 | A1* | 9/2004 | Coles et al. ................... 704/235 |
| 2005/0228861 | A1 | 10/2005 | Hironori et al. |
| 2007/0106724 | A1* | 5/2007 | Gorti et al. .................... 709/204 |
| 2007/0116225 | A1* | 5/2007 | Zhao et al. ............... 379/202.01 |
| 2007/0156843 | A1* | 7/2007 | Sagen et al. .................. 709/217 |
| 2010/0241507 | A1* | 9/2010 | Quinn et al. ................ 705/14.42 |
| 2011/0043597 | A1 | 2/2011 | Greenwood et al. |
| 2013/0047097 | A1* | 2/2013 | Stephens ....................... 715/753 |
| 2013/0170630 | A1* | 7/2013 | Cooper ........................ 379/67.1 |

FOREIGN PATENT DOCUMENTS

| CN | 1662057 | 8/2005 |
| CN | 101351838 | 1/2009 |
| EP | 1873997 | 1/2008 |
| WO | WO 2007/078200 | 7/2007 |

OTHER PUBLICATIONS

"System and method for tag cloud based log file analysis," IP.com Journal, Jun. 2009, 5 pages.
Extended European Search Report for European Patent Application No. 10172585.1, dated Oct. 25, 2010.

(Continued)

*Primary Examiner* — Nigar Chowdhury
(74) *Attorney, Agent, or Firm* — Sheridan Ross P.C.

(57) ABSTRACT

The present invention is directed generally to linking a collection of words and/or phrases with locations in a video and/or audio stream where the words and/or phrases occur and/or associations of a collection of words and/or phrases with a call history.

12 Claims, 5 Drawing Sheets

400 alphabet appearance articles catagories change citation cloud collocate color com content create data design display document flanagan flickr font history http indicate items jim links list manyeyes navigation needed page population presentation represent retrieved search site size social software statements tag text type unsourced used visual web weighted wikipedia www

(56) References Cited

OTHER PUBLICATIONS

Tag Cloud, from Wikipedia, the free encyclopedia, Internet article printed on May 19, 2009, 4 pages.
Official Action with English translation for Korea Patent Application No. 2010-0079276, dated Nov. 7, 2011 7 pages.
Official Action with English Translation for China Patent Application No. 201010257001.6, dated Aug. 8, 2013 7 pages.
Official Action with English Translation for China Patent Application No. 201010257001.6, dated Jan. 22, 2013 8 pages.
Notice of Allowance with English Translation for Korea Patent Application No. 10-2010-0079276, mailed Feb. 26, 2013 3 pages.
Official Action with English translation for Korea Patent Application No. 2010-0079276, dated Jul. 24, 2012 6 pages.
Official Action with English Translation for China Patent Application No. 201010257001.6, dated Jun. 5, 2012 13 pages.
"EveryZing, Taking your content to new heights," Everyzing, Inc., 2008, available at https://web.archive.org/web/20090113235941/http://www.everyzing.com/, 3 pages.
"Obama Victory Speech Word Cloud," OpenProcessing website, 2009, available at https://web.archive.org/web/20111128023329/http://openprocessing.org/visuals/?visualID=831, 2 pages.
"Search Inside Obama's Inaugural Speech," Delve Networks Blog, 2008, available at https://web.archive.org/web/20090122182410/http://blog.delvenetworks.com/2009/01/20/search-inside-obama%E2%80%99s-inaugural-speech/, 3 pages.
"Speech to Text Transcription Services," Tech-Synergy, 2008, available at https://web.archive.org/web/20090221192743/http://tech-synergy.com/Tech-synergy/speechtotext.php, 2 pages.
Notice of Allowance with English Translation for China Patent Application No. 201010257001.6, dated Jan. 23, 2014 5 pages.

* cited by examiner

*Fig. 4* alphabet appearance articles catagories change citation cloud collocate color com content create data design display document flanagan flickr font history http indicate items jim links list manyeyes navigation needed page population presentation represent retrieved search site size social software statements tag text type unsourced used visual web weighted wikipedia www

| Call | Number | Time | Length |
|---|---|---|---|
| [word cloud: talk Tom figures send thought Yes ... ] | 02920817500 | 1 Dec 2001 | 13 minutes |
| [word cloud: need quote update competition loss gone bob ... ] | 02920817500 | 2 Dec 2001 | 10 minutes |

*Fig. 5*

WORD CLOUD AUDIO NAVIGATION

CROSS REFERENCE TO RELATED APPLICATION

Cross reference is made to U.S. patent application Ser. No. 12/543,089, filed Aug. 18, 2009, entitled "Conference Annotation System", which is incorporated herein by this reference in its entirety.

FIELD OF THE INVENTION

The present application relates generally to the field of navigating within media streams and specifically to the field of using word clouds to visualize media streams and navigate therein.

BACKGROUND

When presented with a video, audio, podcast, conference call or any other media file containing audio, it may be difficult to navigate the audio or other media without some form of index. This is sometimes provided manually by offset timestamps alongside text extracts that prompt the reader about a particular section of audio. These extracts and timestamps can be used by a listener to move forward and backward in the media application being used to listen to the audio. In the case of a longer conference call, audio or other media, finding the section of interest can be difficult. If the intent is to quickly find and listen to all the areas where certain topics are covered, this can become extremely challenging.

Some solutions allow searching of audio. Products such as Dragon Audio Mining™ allow conversion of voice to text for data mining purposes. Other applications, such as Wordle™ produce words clouds from text streams.

Some solutions involve indexing an audio or media file and providing offset timestamps with a database. Services exist to convert audio files to text, and some include timestamp information as well. The customer must still make use of the database to search within the data, and the searches that are produced often only reflect occurrences of a search term, and not their relative importance. More advanced searching may allow a user to search for terms and see in a video where those terms are mentioned. Other approaches provide extracts of text as a word tree, which is essentially a collection of phrase start points that allow a user to explore the text where similar phrase use occurs.

The existing solutions, however, fail to provide an effective visualization of the text and link the same to the media. As an example, if during an hour conference regarding a variety of a vendor's products a participant wanted to see which products were discussed the summary would identify this and enable the participant to easily find the place in the stream.

SUMMARY

These and other needs are addressed by the various embodiments and configurations of the present invention. The invention is directed generally to associating (e.g., linking) words and/or phrases (e.g., word clouds) with locations in a video and/or audio stream where the words and/or phrases are used, associating words and/or phrases with locations in a call history where they are used, and/or combinations of these items (e.g., where the word cloud in the call history has the links to the associated positions in the audio and/or video stream).

In a first embodiment, a method is provided that includes the steps:

(a) receiving, by a processor, at least one of an audio and video stream;

(b) identifying, by a processor, occurrences of selected words and/or phrases in the stream; and linking, by a processor, the identified words and/or phrases to timestamps in the stream.

In a second embodiment, a device having a computer operable to:

receive at least one of an audio and video stream;

identify occurrences of selected words and/or phrases in the stream; and link the identified words and/or phrases to timestamps in the stream.

In a third embodiment, a method is provided that includes the steps:

providing, by a processor, a user with a word cloud, the word cloud containing a plurality of words and/or phrases linked to respective locations in an audio and/or video stream where each word and/or phrase occurs;

receiving, by the processor and from the user, a selected word and/or phrase; and providing the user with at least one of (a) a list of locations in the stream where the selected word and/or phrase occurs and (b) a portion of the stream containing the selected word and/or phrase. As will be appreciated, word clouds or tag clouds commonly refer to a process where the frequency is shown by, for example, the size and/or font of the text. Often, words such as "a", "and", "but", "an", "also", "this", "these", and "the" and other commonly occurring words, such as prepositions, adjectives, and adverbs, are omitted from the word cloud.

In one configuration, the above embodiments link the speech-to-text ("STT") processing of video and/or audio files (e.g., podcasts, conferences, etc.) and the subsequent creation of timestamps associated with words in that file. By creating a word cloud that is enabled for "clicking" by a user, the user can be taken directly to a list of locations where that word or phrase is mentioned in the file. By using timestamp indexes created previously by analysis of the text version of the audio, the viewer can be presented with a hyperlinked list of places where that word or phrase is mentioned, thereby allowing direct access to the audio or video portion concerned.

In one configuration, a context-based summary of the use of the word is provided to further pinpoint the area of interest. When a user clicks or otherwise selects the timestamp, the relevant portion of the stream is played from the starting position to nearby for context acclimatization.

In one configuration, all calls are recorded and converted into text by a speech-to-text engine. The text of each call is converted into a word cloud. The word clouds are displayed along side a subscriber's call history. For example, each telephone call has a date, time, and callee/caller pair (which may simply refer to the other party/parties to the call as the subscriber's identifier is common to all pairings), which is indicated by name or telephone number. The word cloud for each telephone call is linked to or displayed adjacent to the corresponding callee/caller pairing. The subscriber could view a summary of the transcript of each call. By clicking on a word or tag of interest, the subscriber would be taken automatically to the respective location(s) in the text and/or recording of the call where the selected word or tag occurs.

The present invention can provide a number of advantages depending on the particular configuration. By way of example, the invention can use word clouds to visualize the words or phrases of interest taken from the automatic speech recognition form and enable simple feedback to the user of the relevant locations for the words or phrases. Alternative methods require complete indexing of the text/phrases and manual search using words entered by the user. This often requires the user to either read all text to find the words worth searching (obviating the need for the search) or to guess at which words may have been mentioned that would be of interest (similar to guessing with a Web search engine). The use of a word cloud performs that summarizing process, and the addition of hyperlinks to the visual word forms and timestamps can improve the feedback to the user. It can provide a call history that provides the user with an overview of what was said, which is far more useful than the current call histories indicating who called when. For example, one could review who he discussed a topic with, or what was discussed on a particular day. It can provide an effective way to review what was said on a call or remember who he discussed a particular topic with.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "word cloud" refers to what may be commonly known as a tag cloud or a weighted list, which is a visual representation of user tags or the word or phrase content of a quantity of text. The tags are usually single words, and the importance, or frequency of occurrence, of a word can be shown with font, size, color, position, orientation and emphasis (e.g., weight, underscore and italicization).

The Summary is neither intended nor should it be construed as being representative of the full extent and scope of the present invention. The present invention is set forth in various levels of detail in the Summary as well as in the attached drawings and the Detailed Description and no limitation as to the scope of the present invention is intended by either the inclusion or non-inclusion of elements, components, etc. in this Summary. Additional aspects of the present invention will become more readily apparent from the Detailed Description, particularly when taken together with the drawings.

BRIEF DESCRIPTION OF THE DRAWINGS

FIG. 4 shows an example of a word cloud according to one embodiment of the present disclosure; and FIG. 5 shows an example of word clouds indexed into a call history.

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

The present disclosure is directed to a word cloud audio navigation apparatus, system and methods of use. While the present disclosure provides several embodiments of the present disclosure, individuals skilled in the art will understand that the embodiments described herein are not intended to limit the disclosure to only these embodiments. The present disclosure is intended to cover alternatives, modifications and equivalents that may be included within the spirit and scope of the disclosure as defined by the claims below.

Figure 1:
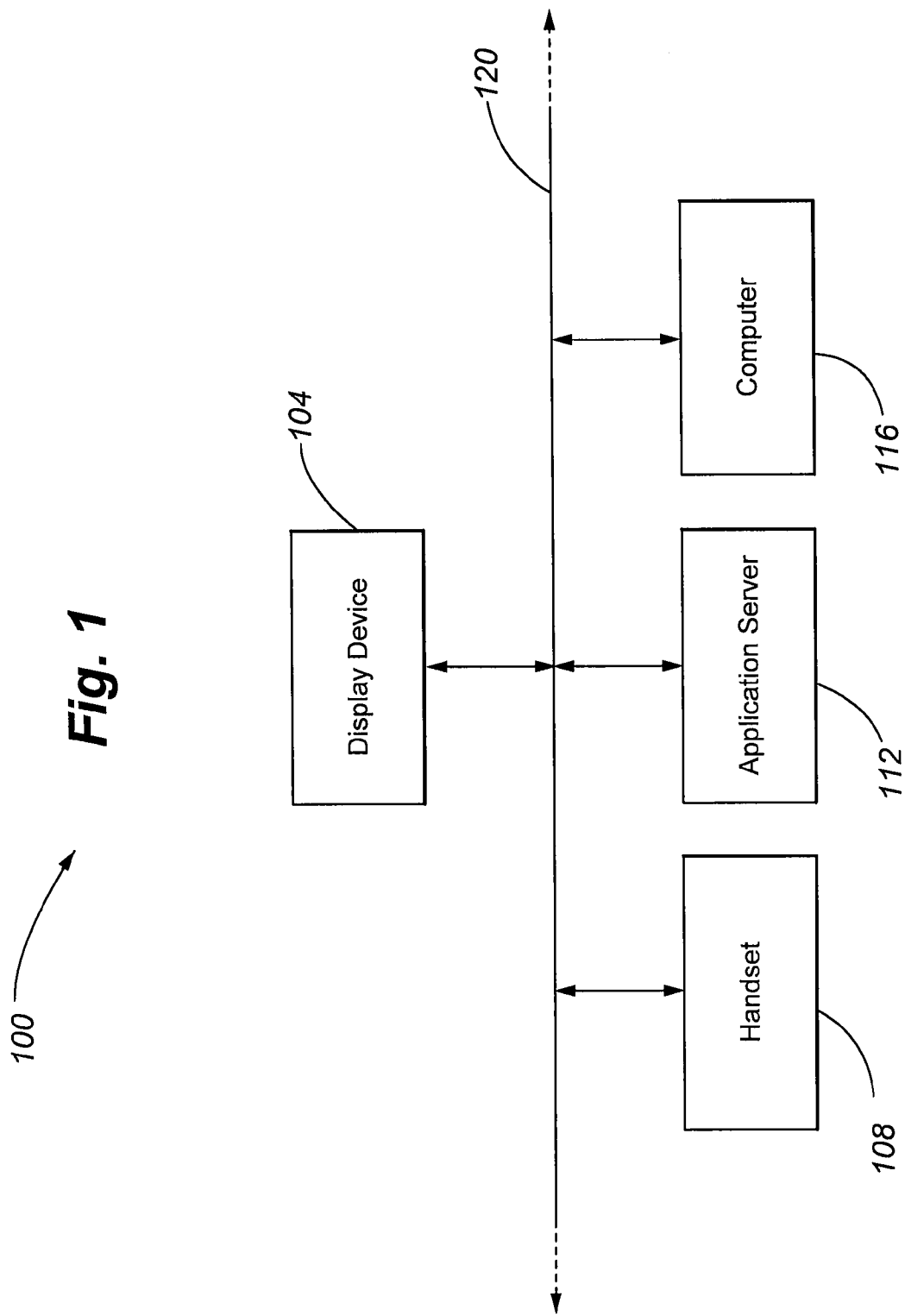
FIG. 1 shows components of a general system in one embodiment of the present disclosure.

Referring now to FIG. 1, a system 100 is shown in one embodiment of the present disclosure having the components of a display device 104, a handset 108, an application server 112 and a computer 116. The components are interconnected by network 120. The network 120 may be a packet-switched network, a circuit-switched network or a combination thereof, that utilizes one or more protocols to interconnect the components attached to the network 120. The network 120 may be comprised of multiple components that are in communication with each other, and may include, for example, a hub, a router, an ATM gateway, a switch and a repeater. The network 120 may be, for example, a LAN, a WAN, the Internet and a wireless network. It will be appreciated that portions of the network may comprise a single connection that places two or more components in direct communication including, for example, a cable, a wireless radio link and infrared communication. Display device 104 is a device that is operable to display text information to a user including, for example, a screen of a type including cathode ray tube, thin film transistor and liquid crystal display. Handset 108 is interconnected to the network 120 and may embody certain aspects of the present disclosure. Handset 108 may be of a variety of packet-based and circuit based communication device including, for example, a cellular phone, a satellite phone, a computer, an internet protocol (IP) telephone, a digital telephone and a conventional touch tone telephone. One having skill in the art will appreciate that handset 108 may be in direct communication with the display 104, application server 112 and/or the computer 116.

Application server 112 is a device that is operable to execute computing tasks, and may be specifically built and/or programmed to execute particular aspects of the present disclosure. The application server 112 may also be a general-purpose computer that has been programmed or is able to be programmed to execute the operations and functions of the present disclosure. As one having skill in the art will appreciate, the application server 112 may include subcomponents including, for example, memory, a processor and a network communication interface. Computer 116 is interconnected to the network 120 and may embody certain aspects of the present disclosure. Computer 116 may be of a variety including, for example, a general purpose computer and a terminal.

Figure 2:
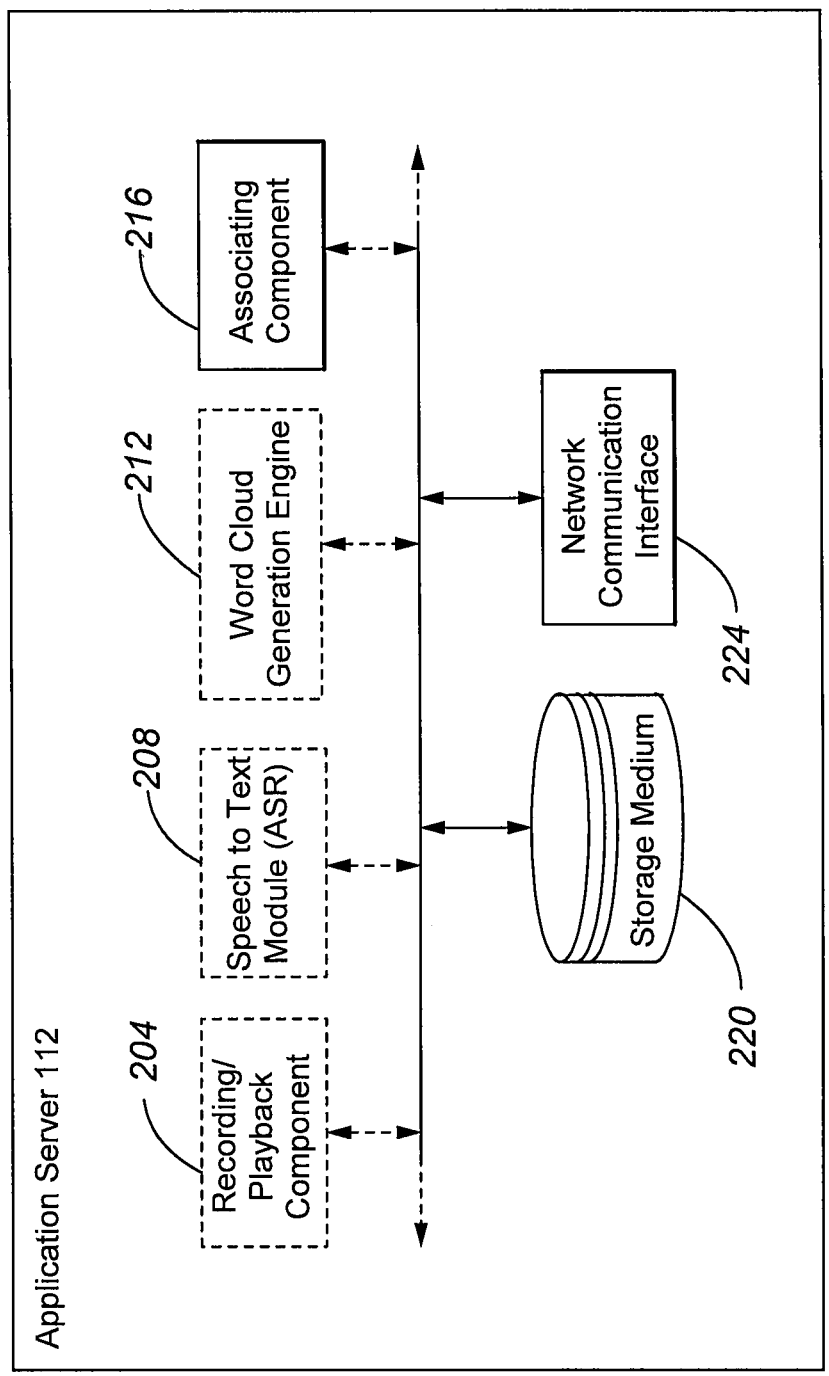
FIG. 2 shows typical elements that may be present in an application server in one embodiment of the present disclosure.

Referring now to FIG. 2, an application server 112 is shown in one embodiment of the present disclosure having the components of a recording/playback component 204, a speech to text module 208, a word cloud generation engine 212, an associating component 216, storage medium 220 and a network communication interface 224. Recording/playback component 204 is a component that performs the encoding and decoding operations that effect the recording and playback of a conference call or other recorded media stream. Recording/playback component 204 may be a software implemented component that is executed on general processing hardware, or it may be specialized hardware installed on the application server 112. One having skill in the art will appreciate that recording/playback component 204 may have one or more of recording and playback functionality. One having skill in the art will further appreciate that recording/playback component 204 may have the ability to process, for example, audio, video, data or a combination thereof, and create a media file and/or read a media file. Speech to text module 208 translates audio into text data (i.e., automatic speech recognition). One having skill in the art will appreciate the methods and algorithms by which this is achieved. Word cloud generation engine 212 performs analysis on the text from the speech to text module 208 and creates a word cloud. Alternatively, word cloud generation engine 212 may receive data from a file having text information and create a word cloud accordingly. Associating component 216 correlates timestamp information from the media file to words identified in a word cloud, by identifying the time(s) or relative location(s) of a word in a media file. Storage medium 220 is an electronic storage area for application data. One having skill in the art will appreciate that storage medium 220 may comprise volatile and/or non-volatile memory. Network communication interface 224 is a component that provides the physical interface between the application server 112 and the network 120, and may include, for example, a network interface card, a radio transmitter, a radio antenna, and an infrared device.

It is another aspect of the present disclosure that certain elements in the foregoing description of application server 112 may be present in other components of the system 100 including, for example, the display device 104, the handset 108 and the computer 116. Accordingly, it should be understood that process steps executed by application server 112 may be executed by any of the other components of system 100 in certain embodiments of the present disclosure, and the steps in process 300 are in no way limited to any one component of system 100.

Figure 3:
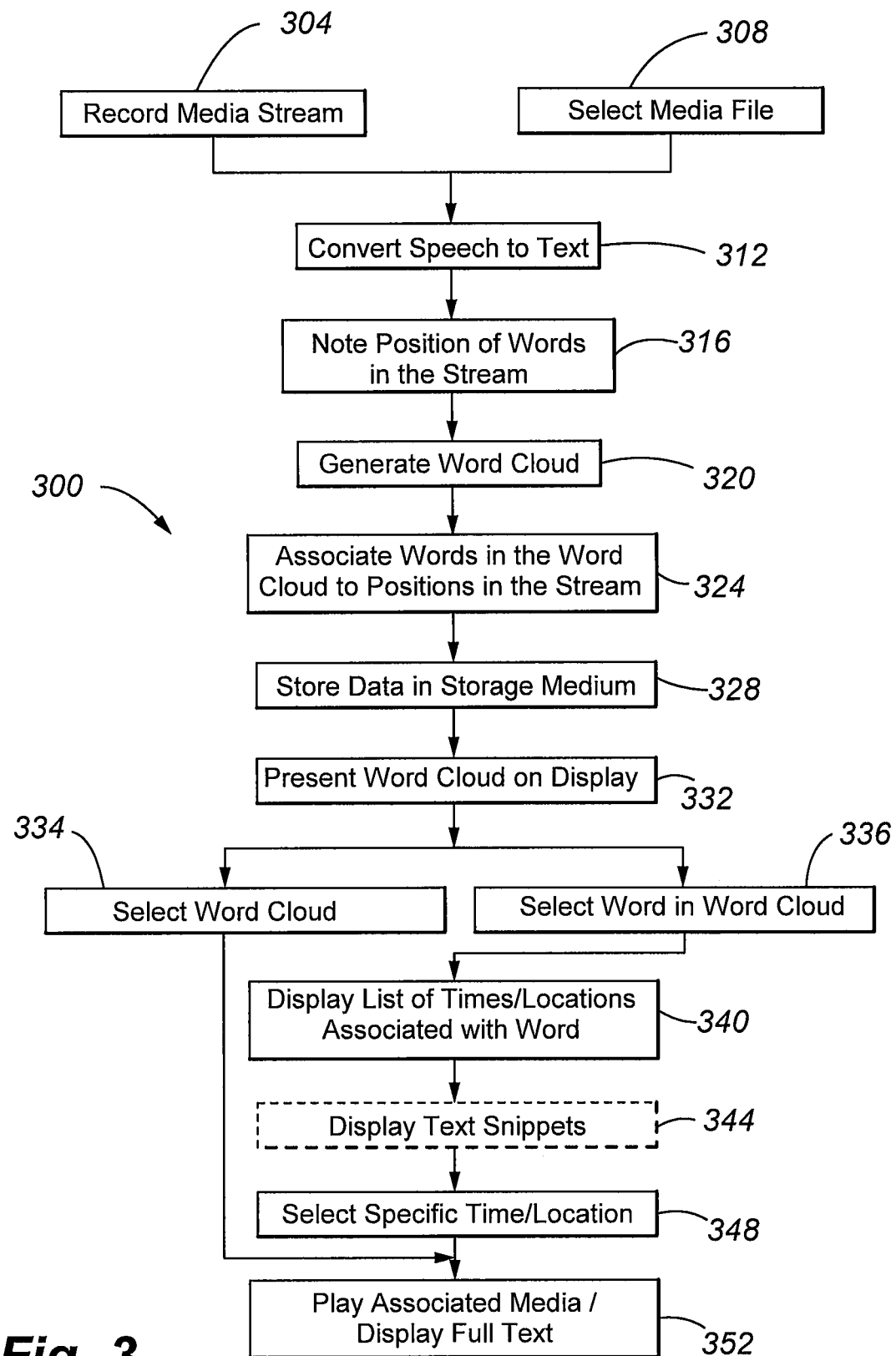
FIG. 3 shows a flow diagram of a process that embodies certain aspects of the present disclosure.

FIG. 3 shows a flow diagram of the process 300 in one embodiment of the present disclosure. The application server 112 may record a media stream in step 304 using recording/playback component 204. The media stream in 304 may be recorded directly to storage medium 220. It is another aspect of the present disclosure that a media file may be selected in 308. In one embodiment of the present disclosure, a user selects a media file in step 308, and in another embodiment of the present disclosure, the application server selects a media file in step 308. It will be appreciated that the selection of a media file by the application server may be performed, for example, on a scheduled basis, under certain system conditions (e.g., when system load is below a certain threshold) and in response to another process. In step 312, the speech to text module will process incoming data, either from 304 or 308, and convert the speech portions to text. In step 316, the converted text will have its time or relative location in a media file recorded. The process up to step 316 is similar to having a transcript of the media file or media stream created with relative time or location identifiers placed next to the transcription. It will be appreciated that steps 312 and 316 may be combined into a single process step. In step 320, the word cloud generation engine 212 receives the text from step 312 and creates a word cloud. One having skill in the art will appreciate the methods and algorithms used to generate the word cloud. In step 324, the words of the word cloud created in step 320 are associated with the time or location that corresponds with their occurrence in the media stream or media file. In step 328, the data representing the associations between words in the word cloud and the media stream or file may be stored in storage medium 220. In step 332, the word cloud is presented to a user on display device 104. In step 336, the user selects a word in the word cloud, such as by "clicking" on the word of interest in the word cloud. In step 340, the display device 104 may then display a list of times and/or locations in the media stream or file that are associated with the word selected in step 336. In step 344, text snippets may be presented to the user on display 104 next to the locations/ times displayed in step 340. One having skill in the art will appreciate the size and display characteristics of the text snippet that will be appropriate for the display and setting. For example, a large display may accommodate larger text snippets comprising a greater amount of words and therefore presenting greater context to the user; whereas smaller displays (e.g., handset 108) may only accommodate a few lines of text and present limited context. One having skill will further appreciate that the text snippet may include a number of words or a portion of text before the actual word selected in step 336. In step 348, the user may select a specific time/instance from the list or display of steps 340 and 344. In step 352, the application server 112 may then skip to the corresponding time in the media that corresponds to the instance and begin playing the media and/or present the full text to the user on display 104 of the location in the text that corresponds to the instance selected in 348. It is another aspect of the present disclosure that the application server select a location in the text and a time in the media that is slightly before the exact time that corresponds to the selected word. It will be appreciated that this may allow a user to better see the context of the selected word, and may save the user from having to rewind the media or scroll up in text to obtain the necessary context.

As noted in FIG. 3, it is another aspect of the present disclosure that a user may select a word cloud in step 334, and then in step 352, the application server will immediately play the media associated with the word cloud and/or present the full text to the user on display 104. This step 334 may be useful in certain embodiments where the word cloud generated in step 320 and presented to the user in 332 is used primarily for summarization purposes, not necessarily navigation purposes.

One having skill in the art will appreciate some of the steps described in process 300 need not be performed in series, and that in certain embodiments, some steps may be performed concurrently or parallel with another step. It will be further appreciated that some steps in process 300 may comprise multi-threaded processes. It will be further appreciated that the output from one step may be streamed to another step, and that data does not necessarily need to be written to storage medium 220 between steps except, possibly, for buffering purposes. For example, data being recorded to a media stream in step 304 may be streamed directly to the speech to text module 208 so that the audio can be converted to text in step 312.

One having skill in the art will further appreciate that the steps described in process 300 may operate in an order different than the order present in the foregoing. Furthermore, it will be appreciated that some process steps may be left out altogether, depending on the intended goal of the claimed process.

FIG. 4 shows an example of a word cloud 400 in one embodiment of the present disclosure. The word cloud was created using Wordle™. Options exist to rotate and combine orientations of words to make more compact as well as change colors/fonts. As can be seen, certain words have accented size and color, which distinguishes their frequency of occurrence in the original text. Common English words were removed before processing. The results of clicking on "audio" would produce a list such as that below:

"Audio" is mentioned at:
00:02.5 When presented with a video, audio file
00:05.1 transcription of a conference containing audio
00:08.5 it is difficult to navigate the audio
00:19.2 text extracts prompting the reader about the section of audio
00:27.1 media player application being used to listed to the audio Each of the timestamps would be hyperlinks into the audio file, offset by the relevant timestamp, enabling the listener to jump directly to that section. Helpful extensions to this would include the ability to start listening a few seconds before to gain context for the use of the phrase.

In one configuration, all calls in an enterprise network or otherwise for a party are recorded and converted into text by a speech-to-text engine. The text of each call is converted into a word cloud. The word clouds are displayed along side a subscriber's call history. For example, each telephone call has a date, time, and callee/caller pair (which may simply refer to the other party/parties to the call as the subscriber's identifier is common to all pairings), which is indicated by name or telephone number. The word cloud for each telephone call is linked to or displayed adjacent to the corresponding callee/caller pairing. The subscriber could view a summary of the transcript of each call. By clicking on a word or tag of interest, the subscriber would be taken automatically to the respective location(s) in the text and/or recording of the call where the selected word or tag occurs.

FIG. 5 illustrates this configuration. A call history 500 for a subscriber is shown. The call history 500 includes a telephone number 504 of the other party (which is identified by the same number), a date/time 508 of the call, a length 512 of the call, and a word cloud 516 descriptive of the corresponding call. As noted, selecting a word in the word cloud for a call automatically provides the context(s) for the selected word at each location of its occurrence in the audio and/or text equivalent of the recorded call.

One having skill in the art will appreciate that the words in word cloud 400 may differ in various presentation aspects to denote different aspects of the word relative to the text and to place different emphasis on certain words.

The exemplary systems and methods of this invention have been described in relation to telecommunications architectures. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a telephone endpoint, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the methodology is used to create tags from media streams from sources other than live voice calls. For example, the methodology may be used to annotate recorded lectures, meetings, and the like.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
receiving, by a processor, a plurality of audio and/or video streams;
identifying, by the processor, a plurality of audio and/or video streams where a user participated;
identifying, by the processor, a call history associated with the plurality of audio and/or video streams where the user participated;
identifying, by the processor, occurrences of selected words and/or phrases in the plurality of audio and/or video streams where the user participated;
linking, by the processor, the identified words and/or phrases to timestamps in the plurality of audio and/or video streams where the user participated to allow a portion of the plurality of audio and/or video streams that contains the selected words or phrases to be provided to the user;
forming, by the processor and from the linked words and/or phrases, a plurality of word clouds for the plurality of audio and/or video streams where the user participated, wherein, in the plurality of word clouds, at least one of a size, font type, font color, and location of a word and/or phrase is a function of a frequency of occurrence of the word and/or phrase in the plurality of audio and/or video streams where the user participated;
displaying the plurality of word clouds along with the call history to the user simultaneously; and
in response to the user selecting a word and/or phrase from one of the displayed plurality of word clouds, providing the user with a time and/or location in the audio and/or video stream or a file associated with the selected word and/or phrase.

2. The method of claim 1, further comprising:
in response to the user selecting a word and/or phrase from the one of the plurality of word clouds, providing the user with a portion of the stream associated with a timestamp linked to the selected word and/or phrase.

3. The method of claim 1, further comprising:
in response to a user selecting a word and/or phrase from the one of the plurality of word clouds, providing the user with a list of locations in the stream containing the selected word and/or phrase.

4. The method of claim 1, wherein at least one of the plurality of streams where the user participated is a recorded live voice call and wherein the at least one of the plurality of streams is indexed into the call history comprising dates and times of calls and call participants, wherein, using the results of the linking step, the locations of the identified words and/or phrases may be located via the timestamps without searching of the surrounding portions of the stream or a text equivalent thereof.

5. The method of claim 1, further comprising:
selecting, by the user, a second one of the plurality of word clouds;
in response to selecting the second one of the plurality of word clouds, playing or presenting a media associated with the second word cloud for summarization purposes.

6. A device, comprising:
a computer operable to:
receive a plurality of audio and/or video streams;
identify a plurality of audio and/or video streams where the user participated;
identify a call history associated with the plurality of audio and/or video streams where the user participated;
identify occurrences of selected words and/or phrases in the plurality of audio and/or video streams were the user participated; and
link the identified words and/or phrases to timestamps in the plurality of audio and/or video streams where the user participated to allow a portion of the plurality of audio and/or video streams that contains the selected words or phrases to be provided to the user, wherein the computer is further operable to form, from the linked words and/or phrases, a plurality of word clouds for the plurality of audio and/or video streams where the user participated, wherein, in the plurality of word clouds, at least one of a size, font type, font color, and location of a word and/or phrase is a function of a frequency of occurrence of the word and/or phrase in the plurality of audio and/or video streams where the user participated, wherein the computer is further operable to display the plurality of word clouds along with the call history to the user simultaneously and in response to the user selecting a word and/or phrase from one of the displayed plurality of word clouds, to provide the user with at least one of a portion of the audio and/or video stream associated with a timestamp linked to the selected word and/or phrase and a list of locations in the audio and/or video stream containing the selected word and/or phrase.

7. The device of claim 6, wherein at least one of the plurality of streams where the user participated is a recorded live voice call, wherein the at least one of the streams is indexed into the call history comprising dates and times of calls and call participants, wherein, using the results of the linking step, the locations of the identified words and/or phrases may be located via the timestamps without searching of the surrounding portions of the stream or a text equivalent thereof.

8. The device of claim 6, wherein the at least a portion of the stream associated with the timestamp is selected such that subparts of the portion precede and follow the selected word and/or phrase.

9. A non-transitory computer readable medium encoded with processor executable instructions that when executed by processor perform the steps of a method, the method comprising:
providing, by a processor, a user with a plurality of word clouds, the plurality of word clouds containing a plurality of words and/or phrases linked to respective locations in a respective audio and/or video stream where each word and/or phrase occurs, wherein the plurality of word clouds are associated with a plurality of audio and/or video streams where the user participated, and wherein the plurality of word clouds are displayed simultaneously to the user;
receiving, by the processor and from the user, a selected word and/or phrase in one of the displayed plurality of word clouds; and
providing the user with at least one of (a) a list of locations in the respective audio and/or video stream where the selected word and/or phrase occurs and (b) a portion of the respective audio and/or video stream containing the selected word and/or phrase, wherein, in the plurality of word clouds, at least one of a size, font type, font color, and location of a word and/or phrase is a function of a frequency of occurrence of the word and/or phrase in the respective audio and/or video stream.

10. The non-transitory computer readable medium claim 9, wherein the user is provided with (a).

11. The non-transitory computer readable medium claim 9, wherein the user is provided with (b).

12. The non-transitory computer readable medium claim 9, wherein the respective stream is a recorded live voice call and wherein the respective stream is indexed into the call history comprising dates and times of calls and call participants, wherein, using the results of the linking step, the locations of the identified words and/or phrases may be located via the timestamps without searching of the surrounding portions of the respective stream or a text equivalent thereof.

* * * * *